United States Patent
Jones et al.

(10) Patent No.: US 7,854,459 B2
(45) Date of Patent: Dec. 21, 2010

(54) AUTOMOTIVE INTERIOR BAMBOO TRIM STRUCTURES

(75) Inventors: Thomas A. Jones, Macomb, MI (US); Raymond A. Beaufait, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/362,180

(22) Filed: Jan. 29, 2009

(65) Prior Publication Data

US 2010/0187847 A1 Jul. 29, 2010

(51) Int. Cl.
*B60R 13/00* (2006.01)
(52) U.S. Cl. .................................. 296/39.1; 296/1.08
(58) Field of Classification Search .............. 296/39.1, 296/1.08
See application file for complete search history.

(56) References Cited

U.S. PATENT DOCUMENTS

| 2,426,113 A | * | 8/1947 | Northcutt | 296/37.13 |
| 4,378,888 A | * | 4/1983 | Reed | 211/63 |
| 2009/0201436 A1 | * | 8/2009 | Strazzanti | 349/16 |

FOREIGN PATENT DOCUMENTS

| JP | 2000-087283 | * | 3/2000 |
| JP | 2000-087284 | * | 3/2000 |
| WO | WO 92/14630 | * | 9/1992 |

OTHER PUBLICATIONS

Bamboo Products, http://www.amazuluinc.com/bamboo-products-bamboo-products.htm, Feb. 3, 2007.*
Bamboo Containers, http://www.naturalusa.com/bamboogrove/pricelistbamcontainers.html, Jul. 19, 2002.*
Chubby's One-Stop Cruiser Shop, Web site http://www.chub-byscruisers.com/shop/100-natural-bamboo-cupholder-p-612.html, Mar. 9, 2010.*
Serkan Toto, "Mitsubishi-fortifies-car-doors-with-bamboo" Dec. 4, 2008, www.crunchgear.cc.
Domenick Yoney, "Bamboo Car" Nov. 7, 2008 www.autobloggreen.com/tag/bamboo+car/.

* cited by examiner

*Primary Examiner*—Dennis H Pedder
(74) *Attorney, Agent, or Firm*—Quinn Law Group, PLLC

(57) ABSTRACT

The present invention provides a variety of interior trim structures for use within a passenger compartment of a motorized vehicle. Each interior trim structure includes a structure body configured to attach to the vehicle. The structure body has at least one exterior wall that is visible to occupants of the passenger compartment. At least a portion of the visible wall is fabricated entirely from a segment of natural bamboo stalk. In one embodiment, the segment is a one-piece, monolithic ring of natural bamboo. Alternatively, the segment can be fabricated as a trim panel that is formed from a plurality of precut natural bamboo slats. The interior trim structure can be configured as a storage receptacle, electronic dial, instrument cluster gauge fixture, storage compartment lid, or cosmetic trim panel.

5 Claims, 3 Drawing Sheets

AUTOMOTIVE INTERIOR BAMBOO TRIM STRUCTURES

TECHNICAL FIELD

The present invention relates generally to interior structures for motorized vehicles, and more specifically to interior storage arrangements, trim panels, and instrument cluster fixtures for vehicle passenger compartments.

BACKGROUND OF THE INVENTION

Conventional motorized vehicles, such as the modern day automobile, include a variety of interior trim structures. The passenger compartment, for example, contains many surfaces that are concealed with aesthetically appealing, cosmetic trim panels. These interior trim articles include the instrument panel, door inner panels, armrests, knee bolsters, and glove compartment doors. Typically, the cosmetic trim is substantially uniform throughout each passenger cabin so as to create a specific style.

The passenger compartment may also include numerous storage arrangements for stowing and retaining personal effects and various convenience items. Such storage arrangements may include cup holders, door side-pockets, the center console, an overhead console, and the glove box. Aside from their inherent functional requirements, all of the storage compartments and receptacles must be designed to meet the aesthetic expectations of the vehicle purchaser.

Vehicle information panels, such as the instrument cluster assembly, communicate information to the driver regarding such things as vehicle speed, fuel level, and an unlimited variety of other data. Depending on the desired design effect, it is commonly known to provide this information in either a traditional analog form, including gauges having a dial with a movable pointer, or in digital form having a digital readout. Information display panels need to be made from a combination of materials that are able to survive automotive quality control requirements, and at the same time meet customer demands with respect to styling and visibility.

Recent practice in the automotive industry is utilization of all plastic parts for fabricating the interior trim panels, instrument cluster dials and housing, and various storage arrangements. The interior trim articles, for example, are conventionally constructed by applying a synthetic decorative covering over a rigid plastic substrate mountable in the vehicular body, with a cellular polyurethane padding interposed between the decorative covering and rigid substrate. Likewise, most storage receptacles and instrument cluster fixtures are blow molded plastic parts.

SUMMARY OF THE INVENTION

According to one embodiment of the present invention, an interior structure for use within a passenger compartment of a motorized vehicle is provided. The interior structure includes a structure body that is configured to operatively attach to the vehicle. The structure body has at least one wall that is visible to occupants of the passenger compartment. At least a portion of the visible wall is fabricated entirely from a segment of natural bamboo stalk. The interior structures of the present embodiment reduce the "carbon footprint" of the vehicle because bamboo is an easily renewable resource that requires significantly less pretreatment and chemical processing prior to vehicle installation.

According to one aspect of this particular embodiment, the segment consists essentially of a single-piece, monolithic ring of natural bamboo. For instance, the segment may be precut from the stalk of a bamboo tree, taking advantage of the natural shape and strength of the plant to fabricate the intended trim structure. Unlike prior art faux-wood grain trim structures, the bamboo structures of the present invention are not fabricated from wood fibers impregnated with a synthetic-resin binder, and adhered to a supporting substructure. This reduces manufacturing time and costs, and minimizes vapor emissions, producing fewer hydrocarbons during fabrication.

As part of one facet of this embodiment, the structure body is fabricated into an annular information panel fixture that is configured to house a gauge or dial therein. In this instance, the monolithic ring of natural bamboo stalk circumscribes a display portion of the gauge.

In accordance with another facet, the structure body is fabricated into an annular storage receptacle configured to securely retain one or more cylindrically-shaped items therein. The monolithic ring of natural bamboo stalk circumscribes a portion of the item when inserted into, and retained by the structure body.

According to another aspect of this embodiment, the structure body is fabricated into an annular dial. The structure body is configured to rotatably mount to an interior surface of the passenger compartment such that selective rotation of the monolithic ring of natural bamboo stalk in the clockwise/counterclockwise direction modifies at least one operating condition of the vehicle, such as cabin temperature, stereo settings, and the HVAC fan speed.

As part of another facet of this embodiment, the segment consists essentially of a plurality of natural bamboo slats that are operatively attached together to form a trim panel. Each slat can be cut from the culm of the bamboo plant, slicing the culm along the longitudinal expanse thereof. In one instance, the body structure may be fabricated into a decorative trim panel, configured to cover a portion of the vehicle instrument panel, a vehicle door assembly, an armrest assembly, a knee bolster, and like structures. Alternatively, the body structure may be designed as a lid, configured to movably mount to the vehicle structure and selectively transition between a closed position, in which the segment obstructs access to a storage compartment, and a generally open position, in which the segment allows for access to the storage compartment.

In an additional facet of this embodiment, the portion of the structure body wall that is visible to vehicle occupants preferably exhibits substantially no soiling, staining or change in appearance when exposed to a common cleaner material, such as, but certainly not limited to, an ammonia, ammonia chloride, isopropanol, or silicone emulsion based cleaner. In a similar regard, the visible wall exhibits a burn rate of less than approximately 1.7 mm/sec.

As part of yet another aspect, the portion of the structure body wall that is visible to vehicle occupants preferably exhibits substantially no marring or scuffing under approximately 750 grams of compressive loading. Scuffing is generally defined as permanent damage (e.g., visible flaking or scratching) to the outer surface of the structure body. Marring is generally defined as a permanent or semi-permanent disfigurement (e.g., a furrow along the outer surface of the structure body).

According to another embodiment of the present invention, a motorized vehicle is provided. The motorized vehicle includes an interior trim structure with a structure body that is operatively attached to the vehicle, inside of the passenger compartment. The structure body has an exterior portion thereof that is visible to occupants of the passenger compartment. The exterior portion of the structure body is fabricated entirely from a single-piece, monolithic ring of natural bamboo, or a plurality of interconnected natural bamboo slats.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
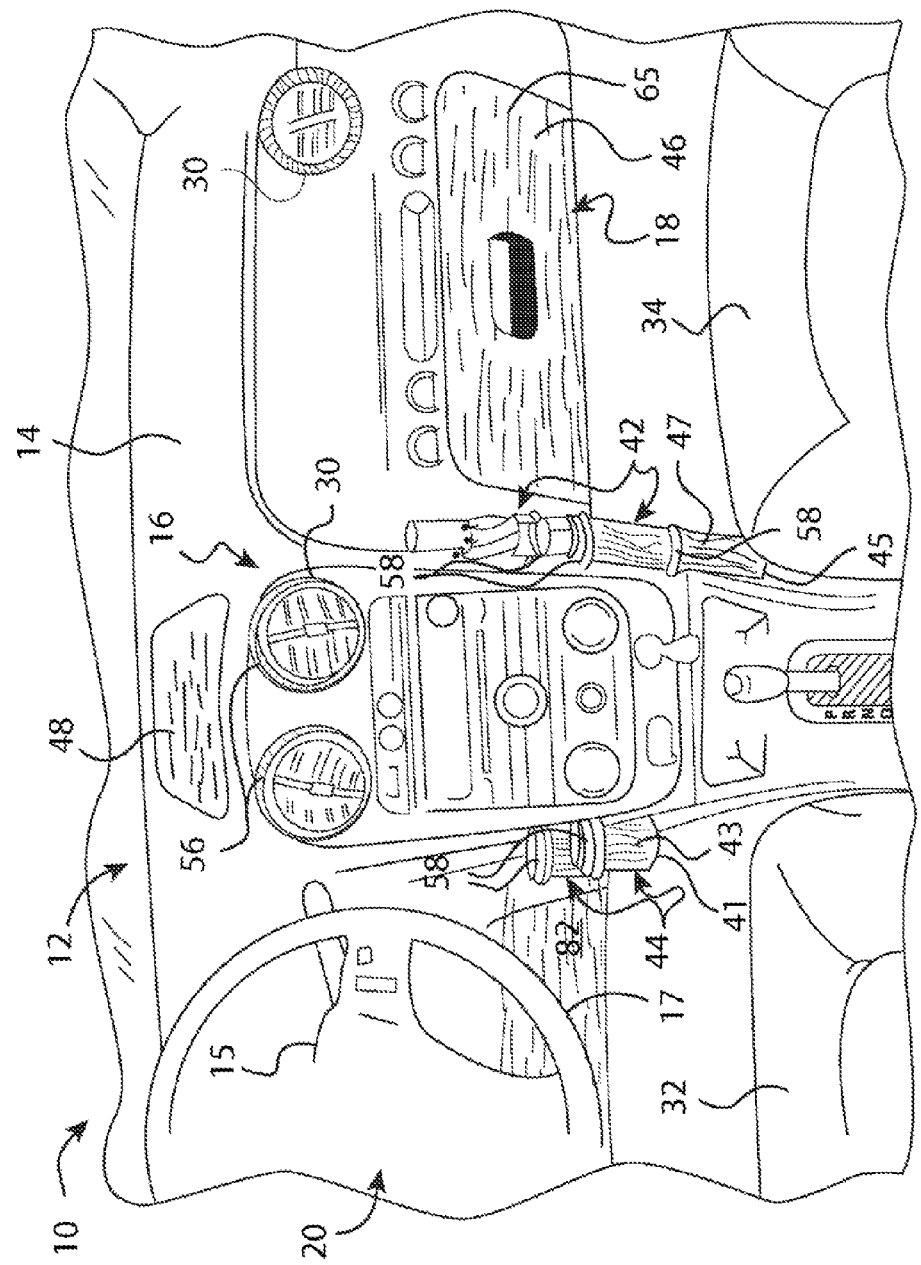
FIG. 1 is a perspective view illustration of a section of the passenger compartment of an exemplary motorized vehicle with various interior bamboo trim structures in accordance with one embodiment of the present invention mounted therein.

Referring to the drawings, wherein like reference numbers refer to like components throughout the several views, FIG. 1 is a perspective-view illustration of the forward portion of a passenger compartment in a representative motorized vehicle, identified generally as 10, with which the present invention may be incorporated and utilized. It should be readily understood that FIG. 1 is merely an exemplary application by which the present invention may be practiced. As such, the present invention is by no means limited to the particular structure or arrangement presented in FIG. 1. By way of example, and not limitation, the interior trim structures of the present invention can be incorporated into any motorized vehicle, such as coupe- or sedan-type passenger cars, trucks, sport utility vehicles (SUVs), heavy duty vehicles, vans, buses, boats, airplanes, trains, etc. In addition, the drawings presented herein are not to scale, and are provided purely for explanatory purposes. Thus, the individual and relative dimensions and orientations shown in the drawings are not to be considered limiting. Finally, it should be readily appreciated that the adjectives used in the specification and claims to specify spatial relationships, such as "forward", "rearward", "inner", "outer", "upper", "lower", etc., indicate spatial relationships as they exist when properly located in their intended orientation with respect to the automobile.

The vehicle 10 includes an interior compartment, such as passenger compartment 12, having vehicle interior structure, which is represented collectively herein by an instrument panel 14 (also known as a "dashboard" or "fascia"), a center console 16, a glove compartment (or "glove box") 18 of conventional design, and a steering wheel assembly, designated generally at 20. A traditional "driver-side" airbag assembly (not shown) is encased within the steering wheel hub 15, which is rigidly attached to and circumscribed by a steering wheel 17.

Figure 2:
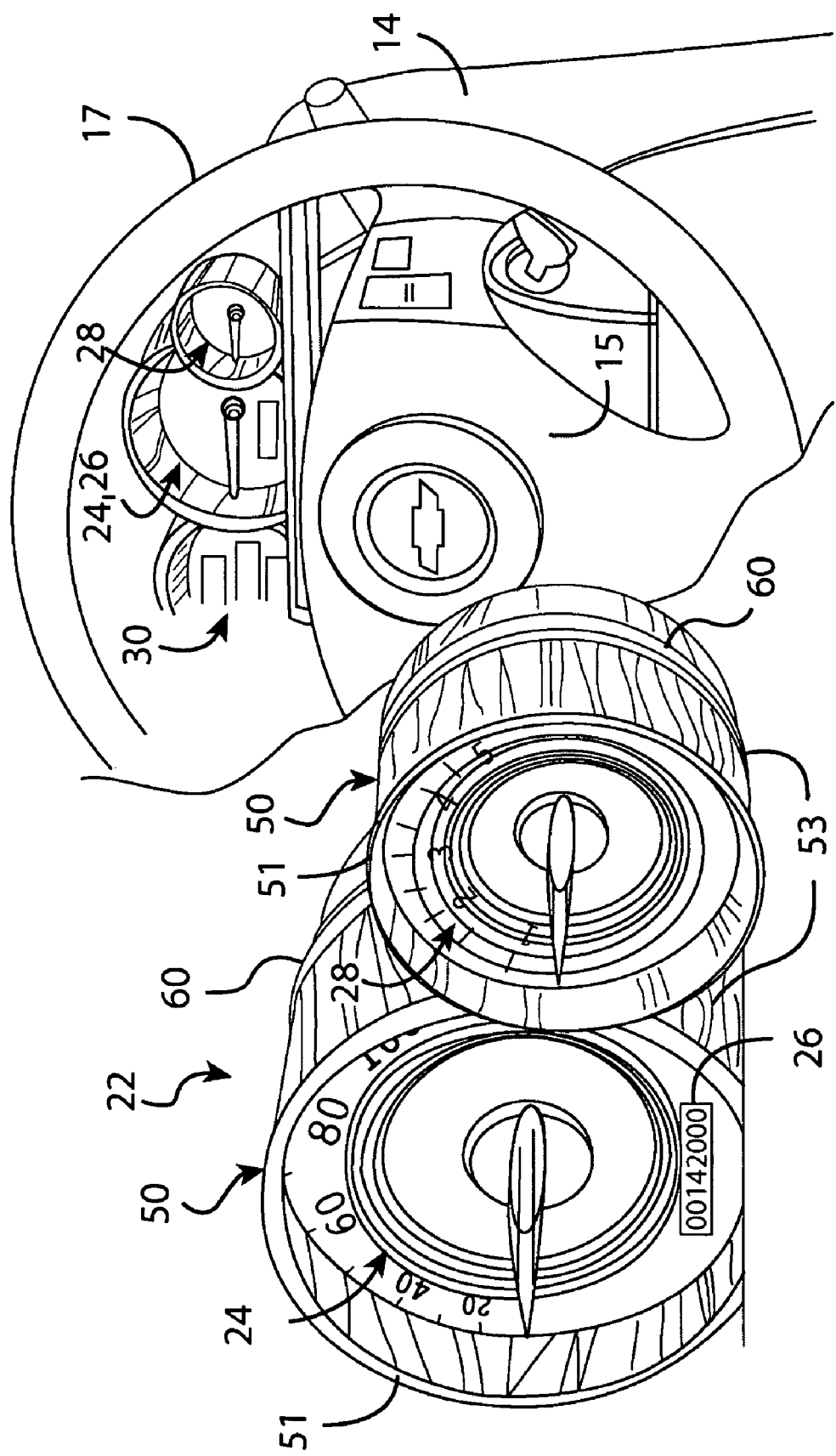
FIG. 2 is a perspective view illustration of an exemplary vehicle instrument cluster with various interior bamboo trim structures in accordance with another embodiment of the present invention mounted thereto.

The instrument panel 14 extends transversely across the vehicle 10, at a forward end of the passenger compartment 12. The instrument panel 14 is configured to house various switches, accessories, and instrumentation, including, for example at the driver side, an electronic instrument cluster 22 (also referred to herein as "information panel") with various digital and/or analog gauges. These gauges may include a speedometer 24, odometer 26, tachometer 28, as well as other information displays, such as a trip odometer, compass, and fuel level, collectively represented at 30 (all of which are visible in FIG. 2 of the drawings). At the front passenger side, the instrument panel 14 houses heating, ventilation, and air conditioning (HVAC) vents 31, the glove compartment 18, and a passenger-side airbag module (not visible). The center console 16 originates at the instrument panel 14, and continues beneath it, running rearward in the passenger compartment 12 between front driver and passenger seat assemblies 32 and 34, respectively. The instrument panel 14 is also designed to cover or conceal various underlying components when installed in the motorized vehicle 10. For instance, the instrument panel 14 overlies a plurality of HVAC ducts, assorted wiring harnesses, and other vehicular componentry (none of which are visible in the illustrations provided).

Figure 4:
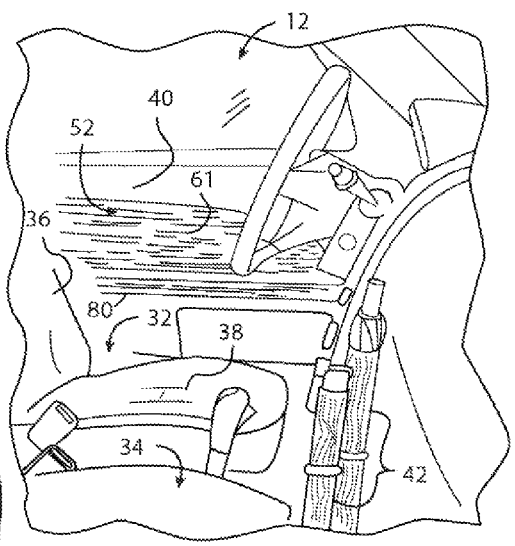
FIG. 4 is an alternate perspective view illustration of the passenger of compartment from FIG. 1 showing an interior bamboo trim structure in accordance with an additional embodiment of the present invention mounted therein.

Each seat assembly 32, 34 can be of any suitable or conventional construction, but generally includes a backrest portion 36 and a lower cushion portion 38 (FIG. 4). The vehicle 10 also includes one or more door assemblies 40 (one of which is visible in FIG. 4) that are secured to the vehicle body 10 in any known manner sufficient to allow each door assembly 40 to transition from a closed position (as shown in FIG. 4) to a generally open position (not shown), allowing for occupant ingress and egress.

In accordance with the present invention, the vehicle passenger compartment 12 is designed to incorporate an array of interior bamboo trim structures. By way of example, and not limitation, the interior bamboo trim structures of the present invention include various storage receptacles 42, cup holders 44, a glove box door 46, storage compartment lids 48 (FIGS. 1 and 5), information panel fixtures 50 (FIG. 2), electronic control dials 52 (FIG. 3), and cosmetic trim panels and fixtures 54 and 56, respectively (seen throughout the various figures). As will be readily understood from the following discussion, the interior bamboo trim structures can be fabricated into other trim articles without departing from the scope and spirit of the claimed inventions.

Each of the interior structures includes a structure body that is configured to operatively attach to the vehicle 10. The storage receptacles 42 and cup holders 44 of FIG. 1, for example, each have a generally cylindrical body 41 and 45, respectively, that is attached to the vehicle structure, namely center console 16, by an annular attachment ring 58. As can be clearly seen in FIG. 1, the structure bodies 41, 45 each have at least one outer wall 43 and 47, respectively, that is visible to occupants of the passenger compartment 12. In effect, a portion of the structure body 41, 45 may be partially concealed by the instrument panel 14 or other vehicle structure, so long as at least one wall is readily visible. Conversely, the structure body 41, 45 may consist solely of the occupant-visible wall portion 43, 47. Moreover, the structure body 41, 45 may include internal structure that is not readily visible.

The exterior portion of each visible wall 43, 47 is fabricated entirely from a segment of natural bamboo stalk. In these particular embodiments, the segment consists essentially of a single-piece, monolithic ring of natural bamboo. For instance, the segment may be precut from the stalk of a bamboo tree, taking advantage of the natural shape, strength, and aesthetic appeal of the plant to fabricate the storage receptacle 42 or cup holder 44. Unlike faux-wood grain trim structures, the bamboo structures of the present invention are not fabricated from wood fibers impregnated with a synthetic-resin binder or other chemical, and adhered or otherwise attached to a supporting substructure. This invention therefore reduces manufacturing time and costs, and minimizes vapor emissions, producing fewer hydrocarbons during fabrication.

The interior structures of the present invention reduce the "carbon footprint" of the vehicle because bamboo is an easily renewable resource that requires significantly less pretreatment and chemical processing prior to vehicle installation. Bamboo is structurally different from that of many other plants. The trunk or stalk of the bamboo plant, more appropriately referred to as the "culm", is hollow on the inside. The hollow sections of the bamboo plant are separated by longitudinally spaced internal dividers, or "nodes". Bamboo is stronger than most wood, yet is more flexible and elastic than their conventional counterparts. When flexed, the stalk will bend slightly, but will not break as easily as wood. In addition, when flexed or deformed for a short period of time, the bamboo stalk will return to its original configuration.

Once established, bamboo replenishes itself significantly faster than trees. Bamboo is the fastest growing "woody" plant in the world. Their growth rate has been known to exceed 1.2 meters/day (1.5-2.0 inches/hr)). Fully developed bamboo culms can therefore be cut every two to three years. Hardwoods or softwoods, on the other hand, may take 20 or more years to replenish after being cut. In addition, a very large volume of bamboo timber can be produced on small acreage.

The bamboo culm can easily be split into multiple pieces. The split can proceed along the fibers, which are in the longitudinal direction, or transversely with respect thereto. In the case of the cup holders 44 and cylindrical storage receptacles 42, each bamboo culm is prescreened to ensure a requisite minimum diameter is available, and to maintain a minimum degree of part-to-part consistency. The culm is then cut into annular rings of predetermined length, shearing the bamboo stalk in the lateral direction. Thereafter, each ring may be post-processed—e.g., sanded, stained, sealed, etc., prior to installation within the passenger compartment 14.

Figure 5:
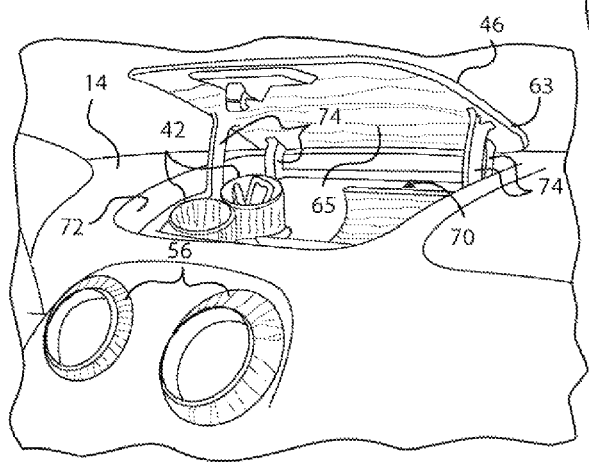
FIG. 5 is an alternate perspective view illustration of the instrument panel from FIG. 3 showing various interior bamboo trim structures in accordance with a different embodiment of the present invention mounted thereto.

Each of the annular storage receptacles 42 shown in FIG. 1 is configured to securely retain one or more cylindrically-shaped items therein, such as a newspaper, magazine, or umbrella. In a similar respect, the bamboo cup holders 44 must be of sufficient diameter and depth to receive and retain a conventional cup, glass, and/or bottle. The bamboo storage receptacles 42 and cup holders 44 may also be used to stow non-cylindrical items that can fit within the internal diameter of the bamboo segment, as seen in FIG. 5. In either instance, the monolithic ring of natural bamboo stalk circumscribes part or all of the item when inserted into, and retained by the structure body.

FIGS. 2-5 illustrate various additional interior bamboo trim structure configurations in accordance with the present invention. As noted hereinabove, like reference numerals are used in FIGS. 2-5 to indicate similar structure from FIG. 1. Looking first at FIG. 2, the interior bamboo trim structure of this particular embodiment is fabricated into an annular information panel fixture 50. In the model provided, the structure body 51 of the fixture 50 is appropriately sized and machined to house at least one gauge or dial therein, such as the speedometer 24 and tachometer 28. In this instance, the monolithic ring of natural bamboo stalk 53, which composes the entire outer wall of the structure body 51, circumscribes the display portion and some of the internal instrumentation of each gauge. The generally cylindrical fixture body 51 is attached to the vehicle structure, namely instrument panel 14, by an annular attachment ring 60 (although, other means of positive attachment are certainly envisioned).

Figure 3:
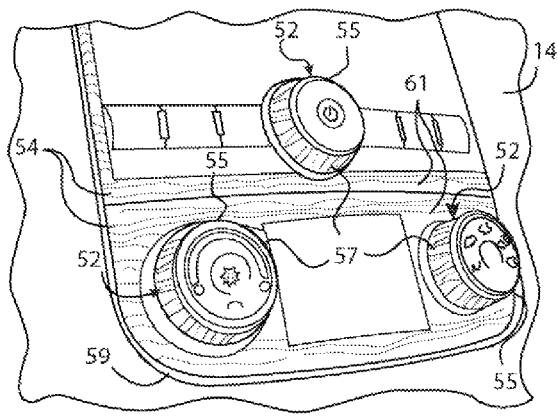
FIG. 3 is a perspective view illustration of an exemplary vehicle instrument panel with various interior bamboo trim structures in accordance with yet another embodiment of the present invention mounted thereto.

In the embodiment presented in FIG. 3, the interior bamboo trim structure is fabricated into an annular dial 52. The structure body 55 of each dial 52 has an outer wall 57 that is visible to occupants of the passenger compartment 12. The exterior portion of each visible wall 57 is fabricated entirely from a segment of natural bamboo stalk. Similar to the previously described embodiments, the visible wall 57 of FIG. 3 consists essentially of a single-piece, monolithic ring of natural bamboo.

The structure body 55 of the annular dial 52 is rotatably mounted to an interior surface of the passenger compartment 12—in this instance, a rearward-facing surface of the center console 16. Selective rotation of the monolithic ring of natural bamboo stalk 57 in the clockwise/counterclockwise direction modifies at least one operating condition of the vehicle, such as cabin temperature, the heating, ventilation, and air conditioning (HVAC) system fan speed, the stereo volume, station, and other settings.

Referring then to FIGS. 3 and 4, the vehicle passenger compartment 12 incorporates a number of decorative, aesthetically appealing, cosmetic trim panels 54. In these particular embodiments, the structure body 59 overlies and covers a portion of the vehicle instrument panel 14 (FIG. 3) and a vehicle door assembly 40 (FIG. 4). Recognizably, the interior bamboo trim panels 54 can be used to cover and conceal other sections of the passenger compartment's internal vehicle structure, such as, but not restricted to, an armrest assembly 80 (FIG. 4), a knee bolster 82 (FIG. 1), and like structures.

The structure body 59 of each bamboo trim panel 54 has an outer wall 61 that is visible to occupants of the passenger compartment 12. The exterior of the visible wall 61 is fabricated entirely from natural bamboo stalk. In this embodiment, the exterior wall 61 consists essentially of a plurality of natural bamboo slats that are adhered, fastened, or otherwise mechanically attached together to form the trim panel. Each slat can be cut from the culm of the bamboo plant, slicing the culm along the longitudinal expanse thereof. Thereafter, the slats may be individually or collectively post-processed—e.g., sanded, stained, sealed, etc., prior to installation within the passenger compartment 12.

Turning next to both FIGS. 1 and 5, the interior trim structure is fabricated into a glove box door 46 (FIG. 1) and a storage compartment lid 48 (FIG. 5). The general construction of the glove box door 46 and storage compartment lid 48 is similar to that of the cosmetic trim panel 54 described hereinabove. That is, the structure body 63 of the door 46 and lid 48 is fabricated entirely from natural bamboo stalk—i.e., a plurality of natural bamboo slats that are adhered, fastened, or otherwise mechanically attached together to form the bamboo panel 65.

Unlike the previously described embodiments, the interior bamboo trim structures 46, 48 are configured to movably mount to the vehicle structure, and selectively transition between a closed and an open position. For example, an upper portion of the instrument panel 14 defines a storage compartment, indicated generally at 70, with a generally-upward facing access opening 72. The body structure 63 of the lid 48 is attached to the instrument panel 14 by an array of laterally offset control arms 74, which allow the lid 46 to pivot from a closed position (not shown), in which the bamboo panel 65 conceals and obstructs the opening 72, and a generally open position, in which the bamboo panel 65 creates an at least partially unobstructed path to the storage compartment 70, as seen in FIG. 5. In a similar regard, the body structure of the glove box door 46 is attached to the instrument panel 14, for example, by one or more laterally oriented hinge pins (not visible), which allow the door 46 to pivot from a closed position (FIG. 1), in which the bamboo panel 65 conceals and obstructs the glove compartment, and a generally open position, in which the bamboo panel 65 creates an at least partially unobstructed path to the glove compartment.

Ideally, in all of the embodiments described above, the portion of the structure body wall that is visible to vehicle occupants preferably exhibits substantially no soiling, staining or change in appearance when exposed to a common cleaner material, such as, but certainly not limited to, an ammonia, ammonia chloride, isopropanol, or silicone emulsion based cleaner. Objectionable soiling, staining or change in appearance greater than slight, or a color transfer to a white test cloth that compares to a rating of less than 4 using the American Association of Textile Colorists and Chemists (AATCC) Gray Scale for Evaluating Staining would be considered unacceptable. In a similar regard, the bamboo structures should have a burn rate of less than approximately 1.7 mm/sec.

As part of yet another aspect, the portion of the structure body wall that is visible to vehicle occupants preferably exhibits substantially no marring or scuffing under approximately 750 grams of compressive loading. Scuffing is generally defined as permanent damage (e.g., visible flaking or scratching) to the outer surface of the structure body. Marring is generally defined as a permanent or semi-permanent disfigurement (e.g., a furrow along the outer surface of the structure body)

While the best modes for carrying out the present invention have been described in detail, those familiar with the art to which this invention relates will recognize various alternative designs and embodiments for practicing the invention within the scope of the appended claims.

The invention claimed is:

1. An interior trim structure for use within a passenger compartment of a motorized vehicle, the interior trim structure comprising:

an annular fixture configured for modifying or displaying information regarding an operating condition of the motorized vehicle and defining a surface configured for concealment; and a structure body circumscribing and contacting said surface of said annular fixture, said structure body having at least one wall visible to occupants of the passenger compartment and fabricated entirely from a monolithic ring of natural bamboo stalk substantially free from wood fiber bound by a resin binder.

2. The interior trim structure of claim 1, wherein said annular fixture is an annular information panel fixture configured to house at least one gauge therein, said monolithic ring of natural bamboo stalk circumscribing and contacting a display portion of said at least one gauge.

3. The interior trim structure of claim 1, wherein said annular fixture is an annular dial configured to rotatably mount to an interior surface of the passenger compartment such that selective rotation of said monolithic ring of natural bamboo stalk modifies said operating condition of the motorized vehicle.

4. The interior trim structure of claim 1, further including an annular attachment ring, wherein said annular attachment ring operatively attaches said structure body to said annular fixture.

5. A motorized vehicle having a passenger compartment, the motorized vehicle comprising:

a vehicle structure disposed within the passenger compartment and an interior trim structure including a structure body operatively attached to said vehicle structure, said structure body having at least one wall visible to occupants of the passenger compartment and fabricated entirely from one of a monolithic ring of natural bamboo stalk substantially free from wood fiber bound by a resin binder, and a plurality of longitudinal slats of natural bamboo stalk attached to one another and each substantially free from wood fiber bound by a resin binder, wherein said vehicle structure is an annular fixture configured for modifying or displaying information regarding an operation condition of the motorized vehicle, and wherein said structure body circumscribes and contacts said annular fixture.

* * * * *